United States Patent Office 3,282,920

Patented Nov. 1, 1966

1

3,282,920

METHOD FOR PRODUCING 5'-NUCLEOTIDES

Shunji Ouchi, Hiraku Yamada, Kozo Tsunoda, Naohito Kameyama, and Saburo Senoo, all of Tokyo, Japan, assignors to Asahi Kasei Kogyo Kabushiki Kaisha, Kita-ku, Osaka, Japan, a corporation of Japan No Drawing. Filed Mar. 18, 1964, Ser. No. 352,954
Claims priority, application Japan, Mar. 19, 1963, 38/12,774
5 Claims. (Cl. 260—211.5)

This invention relates to a method for producing 5'-nucleotides (nucleoside 5'-monophosphates) protected at 2', 3'-positions, more particularly to a method of producing said nucleotides having a general formula;

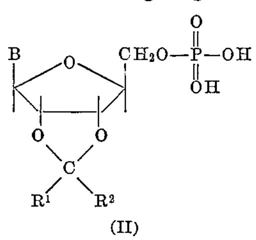

(II)

by reacting nucleosides protected at 2', 3'-positions having the general formula;

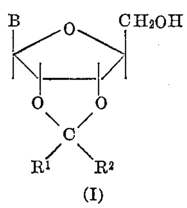

(I)

wherein B represents a base selected from the group consisting of purines and pyrimidines, and $R^1$, $R^2$ represent a radical selected from the group consisting of alkyl and aryl, with phosphorus oxytrichloride in such a manner that phosphate esterification of 5'-position of said nucleosides may be carried out.

The nucleotide derivatives which are represented by the Formula II are generally known as intermediate products in the manufacturing process of 5'-nucleotides.

It is known that, by hydrolizing 2',3'-alkylidene or arylalkylidene) 5'-nucleotides obtained through the above method under the conventional acid conditions free 5'-nucleotides (III) can be obtained. One of such hydrolization methods is that pH of the solution as used is adjusted to 2.7 and boiled for one hour.

The structural formula of 5'-nucleotides is

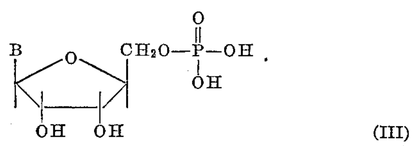

(III)

(B representing a nucleic acid base). The purine nucleotides are compounds which are noted as chemical condiments. Further the pyrimidine nucleotides yield pyrophosphate derivatives and serve as medicines and pharmaceuticals.

There are broadly known the methods in which 5'-nucleotides are manufactured by the phosphoric acid esterification of 5'-hydroxyl group of the nucleosides through phosphorus oxytrichloride. That is to say, according to Todd et al. (page 2476 of Journal of Chemical Society, 1949) and Khorana et al. (page 3747, volume 79 of Journal of American Chemical Society, 1957), the phosphoric acid esterification reaction of 5'-hydroxyl group is carried out, in the existence of a basic solvent such as pyridine, employing the equivalent or surplus molecular weight of phosphorus oxytrichloride, keeping the reaction at a low temperature. Such conventional methods are very disadvantageous for industry since a great quantity of pyridine is required and the reaction temperature is very low, that is —20° C. or so, and further the obtained yield is only 20 to 30 percent. At present, therefore, the phosphoric acid esterification is carried out by an organic phosphorylating agent in which tetra-p-nitrophenylpyrophosphate is employed (Chamber et al., page 3747 of volume 79 of Journal of American Chemical Society, 1957).

2

The present invention is intended to provide an economically advantageous method in which, as in the methods of Todd et al. and Khorana et al., phosphorus oxytrichloride is used so that the same satisfactory yield of nucleotide as that of an organic phosphorylating agent such as the tetra-p-nitrophenylpyrophosphate may be obtained.

Further the present invention provides a method in which, in the reaction represented by the following formula:

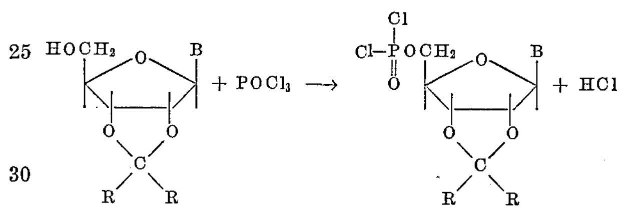

(R represents an alkyl group or aryl group and B represents a nucleic acid base), 2',3'-alkyliden (or allyliden) nucleosides and produced 2',3'-O-protected nucleoside-5'-phosphorodichloridate phosphorus oxytrichloride, viz., the phosphorus oxychloride is used not only as a phosphorylating agent but as a solvent without employing any other solvent. Furthermore, the reaction is well controlled at about the room temperature.

According to the present invention, low 2',3'-alkylidene (or arylalkylidene) nucleosides are suspended in surplus phosphorus oxytrichloride, and the phosphoric acid esterification is carried out in a temperature range of 0° C. to 60° C. and preferably 0° C. to 30° C. At temperatures below 0° C., extremely great reaction time is required and the function of the phosphorus oxytrichloride as a solvent is reduced, while in case the temperature is above 60° C., the reaction proceeds poorly and the resultant nucleoside phosphorodichloridate is so unstable as to cause decomposition, the rate of recovery thereof being low and impractical.

The phosphorus oxytrichloride may be used in an amount only enough to operate as a solvent. However, the more said amount increases, the more convenient the operation becomes and the better the efficiency becomes. Theoretically, one molecular weight of the phosphorus oxytrichloride suffices for one molecular weight of the 2',3'-O-alkylidene (or arylalkylidene) nucleoside. Such an amount of phosphorus oxytrichloride causes the reaction to proceed only with difficulty, so that the operation is also very difficult.

In the present invention, it is preferable that more than several times as much as the theoretical amount of phosphorus oxytrichloride is used in an amount sufficient to suspend the substrate, insofar as the stirring and other operations are not disturbed. Although use of sufficiently excessive phosphorus oxytrichloride causes the substrate to be entirely dissolved, it is not necessary that such a large quantity of phosphorus oxytrichloride be used at the start of the reaction. However, even if the phosphoric acid esterification reaction is carried out by using a quite excessive quantity of phosphorus oxytrichloride, no trouble is caused. In this case, surplus phosphorus oxytrichloride can be easily recovered according to known methods, such as by reduced pressure distillation.

The produced 2',3'-O-protected nucleoside phosphorodichloridate is readily hydrolyzed to 2',3'-O-protected 5'-nucleotide II by dissolving the said dichloridate. Further, this 5'-nucleotide is converted into a 2',3'-O-position free 5'-nucleotide (5'-nucleotide having no protective radical) by acid hydrolysis.

It is preferable that the 2',3'-O-alkylidene (or arylalkylidene nucleosides raw materials be isopropylidene or benzylidene nucleoside. In effect, if a nucleoside is so protected that the 2',3'-hydroxyl group is not decomposed in the subsequent reaction, such a nucleoside may be used.

Further, even if the basic portion is pyrimidine, the phosphoric acid esterification can be carried out in the same manner as with purine.

The present invention will be more definitely illustrated by the following examples.

*Example 1.*—3.24 g. (10 millimol) of 2',3'-O-isopropylidene guanosine and 50 g. (0.33 mol) of phosphorus oxytrichloride are mixed, stirred for seven hours and kept at 10° C. Then surplus phosphorus oxytrichloride is removed by reduced pressure distillation at the reaction temperature. The resultant glutinous residue is cooled and gradually-added water or pieces of ice are gradually added with great care (attention must be paid when several grams of water or ice is first added). After 100 g. of water or ice is added, the solution of caustic alkali is added so that the pH may be adjusted to 2.5–3.0, while the cooling operation is continued (the result of 2';3'-O-isopropylidene guanosine-5'-phosphoric acid estimation by the filter paper electrophoresis and resin chromatography methods: The yield of 5'-guanylic acid is about 90 percent). After this pH adjustment, the solution is heated in an ordinary manner to remove the isopropyliden group. After removal of the isopropylidine group, the solution is treated with a chloride type basic resin and the adsorbed guanosine-5'-phosphoric acid is eluted with dilute hydrochloric acid. The effluent thus resulting is adjusted to pH 8.6 by a solution of lithium hydroxide and then barium acetate is added thereto. Further, alcohol is added to this solution in an amount twice as much as the latter, then cooled and left to stand, thereby barium salt of guanosine-5'-phosphoric acid being formed. (In addition, by means of adding acetone to the solution from which the acetone has been removed, impure guanosine, 5'-phosphoric acid can be easily obtained.) The yield of the barium salt is 4.1 g. (yield: 82 percent. The quantity of pure guanosine-5'-phosphoric acid is 2.98 g.).

*Example 2.*—3.8 g. (10 millimols) of 2',3'-O-isopropylidene inosine and 46 g. (0.3 mol) of phosphorus oxytrichloride are mixed and stirred for six hours at 15° C. In the same manner as Example 1, surplus phosphorus oxytrichloride is removed and the resultant residue is dissolved in water. (The yield of 2',3'-O-isopropylidene inosine-5'-phosphoric acid is about 88 percent.) Equally, after removal of the isopropylidene group, 2.75 g. (yield: 79 percent) of pure inosine-5'-phosphoric acid can be obtained in the same manner as Example 1.

*Example 3.*—46 g. (0.3 mol) of phosphorus oxytrichloride is added to 3.07 g. (10 millimol) of 2',3'-O-isopropylidene adenosine and then stirred for five hours at 30° C. so that the reaction may be effected. The subsequent treatment and operation are performed in the same manner as Example 1 and thereby 2.63 g. (yield: 76 percent) of pure adenosine-5'-phosphoric acid can be obtained.

*Example 4.*—1.42 g. (5 millimol) of 2',3'-O-isopropylidene uridine and 30 g. (0.2 mol) of phosphorus oxytrichloride are mixed, stirred and kept at 10° C. for six hours. (The yield of 2',3'-O-isopropylidene uridine-5'-phosphoric acid is about 83 percent.) In the same manner as above, 2.3 g. (Yield: 71 percent) of pure uridine-5'-phosphoric acid can be obtained.

What we claim is:

1. A process for preparing 5'-nucleotides (nucleoside 5'-phosphates) having the general formula:

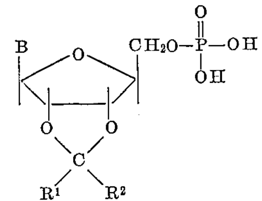

by reacting a nucleoside protected at 2',3'-O-positions having the general formula:

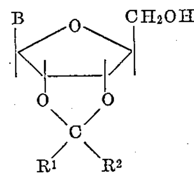

wherein B represents a base selected from the group consisting of adenine, guanine, hypoxanthene, uracil, and cytosine, and when $R_1$ is hydrogen, $R_2$ is selected from the group consisting of methyl and phenyl, and when $R_1$ is methyl, $R_2$ is methyl, with an excess amount of phosphorus oxytrichloride, while maintaining the temperature in the range of 0°–60° C., and then distilling off the unreacted phosphorus oxytrichloride and admixing the thus obtained residue with cold water.

2. The process according to claim 1 wherein said nucleosides protected at 2',3'-position is selected from the group consisting of 2',3'-isopropylidene purinenucleosides, 2',3'-benzylidene purinenucleosides and 2',3'-benzylidene pyrimidinenucleosides.

3. The process according to claim 1, in which the temperature of the reaction is in the range of 0°–30° C.

4. The process according to claim 1, in which the molar amount of phosphorus oxytrichloride is in excess of the substrate nucleosides.

5. The method in which 5'-nucleotide having a protecting group obtained by claim 1 is hydrolyzed to produce 5'-nucleotides that are free of said protecting group.

References Cited by the Examiner

UNITED STATES PATENTS

| | | | |
|---|---|---|---|
| 2,482,069 | 9/1949 | Ruskin | 260—211.5 |
| 2,645,637 | 7/1953 | Todd et al. | 260—211.5 |

FOREIGN PATENTS

| | | |
|---|---|---|
| 1,119,278 | 12/1961 | Germany. |

LEWIS GOTTS, *Primary Examiner.*

JOHNNIE R. BROWN, *Assistant Examiner.*